US012492346B2

(12) United States Patent
Joensen et al.

(10) Patent No.: US 12,492,346 B2
(45) Date of Patent: Dec. 9, 2025

(54) PROCESS AND PLANT FOR CONVERTING OXYGENATES TO GASOLINE WITH IMPROVED GASOLINE YIELD AND OCTANE NUMBER AS WELL AS REDUCED DURENE LEVELS

(71) Applicant: Topsoe A/S, Kgs. Lyngby (DK)

(72) Inventors: Finn Joensen, Hørsholm (DK); Arne Knudsen, Copenhagen (DK); Mathias Jørgensen, Hillerød (DK); John Bøgild Hansen, Humlebaek (DK)

(73) Assignee: TOPSOE A/S, Kgs. Lyngby (DK)

( * ) Notice: Subject to any disclaimer, the term of this patent is extended or adjusted under 35 U.S.C. 154(b) by 242 days.

(21) Appl. No.: 18/286,472

(22) PCT Filed: Apr. 20, 2022

(86) PCT No.: PCT/EP2022/060362
§ 371 (c)(1),
(2) Date: Oct. 11, 2023

(87) PCT Pub. No.: WO2022/223581
PCT Pub. Date: Oct. 27, 2022

(65) Prior Publication Data
US 2024/0124783 A1  Apr. 18, 2024

(30) Foreign Application Priority Data
Apr. 20, 2021  (DK) ............... PA 2021 00392

(51) Int. Cl.
C10G 50/00 (2006.01)
C10G 3/00 (2006.01)
C10G 45/64 (2006.01)

(52) U.S. Cl.
CPC ............... *C10G 3/49* (2013.01); *C10G 45/64* (2013.01); *C10G 50/00* (2013.01); *C10G 2400/02* (2013.01)

(58) Field of Classification Search
None
See application file for complete search history.

(56) References Cited

U.S. PATENT DOCUMENTS 3,879,486 A   4/1975  Mitchell, Jr.
4,035,430 A   7/1977  Dwyer et al.
(Continued)

FOREIGN PATENT DOCUMENTS

CN  102746877 A  10/2012
CN  104419441 A  3/2015
(Continued)

OTHER PUBLICATIONS

Berry, R. I., "Gasoline Or Olefins From An Alcohol feed", Chemical Engineering, Access Intelligence Association, Rockville, vol. 8, No. 8, Apr. 21, 1980, pp. 86-88.
(Continued)

*Primary Examiner* — Tam M Nguyen
(74) *Attorney, Agent, or Firm* — Boone IP Law

(57) ABSTRACT

Process for converting an oxygenate feed stream, the process comprising the steps of: conducting the oxygenate feed stream to an oxygenate-to-gasoline reactor, suitably a methanol-to-gasoline reactor (MTG reactor) under the presence of a catalyst active for converting oxygenates in the oxygenate feed stream into a raw gasoline stream comprising C3-C4 paraffins and C5+ hydrocarbons; and adding an aromatic stream to the MTG reactor.

20 Claims, 3 Drawing Sheets

(56) References Cited

U.S. PATENT DOCUMENTS

| | | | |
|---|---|---|---|
| 4,260,839 A | 4/1981 | Chen et al. | |
| 4,481,305 A | 11/1984 | Jorn et al. | |
| 4,520,216 A | 5/1985 | Skov et al. | |
| 4,709,113 A | 11/1987 | Harandi et al. | |
| 4,788,369 A | 11/1988 | Marsh et al. | |
| 4,835,329 A | 5/1989 | Harandi et al. | |
| 5,177,279 A * | 1/1993 | Harandi | C10G 3/49 585/329 |
| 6,784,333 B2 | 8/2004 | Juttu | |
| 7,057,084 B2 | 6/2006 | Nielsen et al. | |
| 11,254,882 B2 | 2/2022 | Keusenkothen | |
| 2003/0118496 A1 | 6/2003 | Nielsen et al. | |
| 2005/0143610 A1 | 6/2005 | Mitchell et al. | |
| 2008/0172931 A1 | 7/2008 | Bazzani | |
| 2009/0071871 A1* | 3/2009 | Joensen | C10G 3/49 208/66 |
| 2010/0048969 A1 | 2/2010 | Lauritzen et al. | |
| 2011/0196113 A1* | 8/2011 | Nesterenko | C07C 1/26 526/75 |
| 2011/0301394 A1 | 12/2011 | Chen et al. | |
| 2012/0036889 A1 | 2/2012 | Iaccino et al. | |
| 2012/0165581 A1 | 6/2012 | Dupassieux | |
| 2016/0090332 A1* | 3/2016 | Buchanan | C10G 3/49 585/408 |
| 2018/0371338 A1 | 12/2018 | Velasco et al. | |
| 2019/0040324 A1 | 2/2019 | Dittrich | |
| 2020/0231880 A1 | 7/2020 | Rajagopalan et al. | |
| 2021/0078921 A1 | 3/2021 | Harandi | |

FOREIGN PATENT DOCUMENTS

| | | |
|---|---|---|
| CN | 104447157 A | 3/2015 |
| CN | 105885912 A | 8/2016 |
| CN | 104496743 B | 11/2016 |
| CN | 111518584 A | 8/2020 |
| EP | 2036970 A2 | 3/2009 |
| EP | 3110919 A1 | 1/2017 |
| WO | 2017/052854 A1 | 3/2017 |
| WO | 2017/052858 A1 | 3/2017 |
| WO | 2018/007484 A1 | 1/2018 |
| WO | 2019/164610 A1 | 8/2019 |
| WO | 2019/020513 A1 | 10/2019 |
| WO | 2019/228797 A1 | 12/2019 |
| WO | 2020/150053 A1 | 7/2020 |

OTHER PUBLICATIONS

European Search Report with English translation mailed on Sep. 16, 2021 by the European Patent Office for European Application No. (EP 21169304.9).

First Technical Examination and Search Report mailed on Feb. 25, 2020 by the Danish Patent and Trademark Office in corresponding Danish Patent Application No. PA201901251. (8 pages).

International Preliminary Report on Patentability received for PCT Patent Application No. PCT/EP20/078992, mailed on May 5, 2022, 7 pages.

International Search Report and Written Opinion received for PCT Patent Application No. PCT/EP2020/078992, mailed on Jan. 22, 2021, 10 pages.

International Search Report and Written Opinion received for PCT Patent Application No. PCT/EP2022/060364, mailed on Aug. 12, 2022, 10 pages.

International Search Report and Written Opinion mailed on Aug. 18, 2022, by the European Patent Office for International Application No. PCT/EP2022/060362.

Official Action mailed on Nov. 8, 2021 by the Danish Patent and Trademark Office for Danish Application No. PA 2021 00392.

Packer, "The Production of Methanol and Gasoline" Chemical Processes in New Zealand (2nd Ed) 1998, pp. 1998 VII-D-1-19.

* cited by examiner

PROCESS AND PLANT FOR CONVERTING OXYGENATES TO GASOLINE WITH IMPROVED GASOLINE YIELD AND OCTANE NUMBER AS WELL AS REDUCED DURENE LEVELS

TECHNICAL FIELD

The present invention relates to a process and plant for converting an oxygenate feed stream such as e-methanol into a raw gasoline stream comprising C3-C4 paraffins and C5+ hydrocarbons in a methanol-to-gasoline (MTG) reactor; and adding an aromatic stream with the oxygenate feed stream. Embodiments of the invention include providing an MTG reactor having arranged along its length a fixed bed or a plurality of successive fixed beds comprising a catalyst, thereby defining a total bed length; operating the MTG reactor adiabatically as well as adding the aromatic stream at 40-80% of the total bed length, such as at 50-70% of the total bed length. Embodiments of the invention include also C3-C4 compounds, e.g. as liquified petroleum gas (LPG), formed during the oxygenate conversion, being separated and upgraded to aromatic compounds such as benzene, toluene, xylene, or combinations thereof, in an upgrading reactor, suitably an electrically heated reactor (e-reactor). Embodiments of the invention include also separation of a benzene-rich fraction from the aromatic compounds which is then added as the aromatic stream to the MTG reactor: and separating from the raw gasoline stream a gasoline product stream comprising the C5+ hydrocarbons. The invention enables i.a. higher yield and octane number of the raw gasoline and downstream gasoline product while maintaining or even reducing its durene level.

BACKGROUND

The known technology for gasoline synthesis from oxygenates such as methanol involves plants comprising a MTG section (methanol-to-gasoline section) and a downstream distillation section. The MTG section may also be referred as MTG loop and comprises: a MTG reactor; a product separator for withdrawing a bottom water stream, an overhead recycle stream from which an optional fuel gas stream may be derived, as well as a raw gasoline stream comprising C2 compounds, C3-C4 paraffins (LPG) and C5+ hydrocarbons (gasoline boiling components); and a recycle compressor for recycling the overhead recycle stream by combining it with the oxygenate feed stream, e.g. methanol feed stream. The overhead recycle stream (or simply, recycle stream) acts as diluent, thereby reducing the exothermicity of the oxygenate conversion. In the distillation section, C2 compounds are removed in a de-ethanizer, such as de-ethanizer column, and then a C3-C4 fraction is removed as LPG as the overhead stream in a LPG-splitting column (LPG splitter), while stabilized gasoline is withdrawn as the bottoms product. The stabilized gasoline or the heavier components of the stabilized gasoline, such as the C9-C11 fraction may optionally be further treated and thereby refined, e.g. by conducting hydroisomerization (HDI) into an upgraded gasoline product.

During the gasoline synthesis according to the well-established and commercially available MTG technology, catalyst lifetime and octane numbers decline slowly but steadily, because selectivity to aromatics decreases. The standard solution to maintain the octane number would be to operate the gasoline synthesis at more severe conditions. This compromises gasoline yields and catalyst longevity.

It is known that durene (1,2,4,5-tetramethylbenzene) is one of the compounds formed during the conversion of oxygenates such as methanol to gasoline. It has good octane numbers (estimated blend RON 154) but it has a very high freezing/melting point (79.2° C.). To avoid plugging problems in the vehicles engine filters in cold weather, the durene content in the gasoline has to be limited to a low value, e.g. 4-8 wt %, depending on regional climate.

It is also known to convert LPG to aromatic compounds. CN 104447157 discloses a process for preparing an aromatic hydrocarbon mixture rich in benzene, methylbenzene and xylene from methanol through light olefins.

CN 104496743 discloses a method of preparing aromatic hydrocarbon mixture rich in benzene, toluene and xylene (BTX) by conversion of methanol to light olefins in fixed bed reactor.

US 20200231880 (WO 200150053 A1) discloses a method for conversion of an oxygenate feed to gasoline, separating a light paraffin stream comprising C3-C4 paraffins and a stream comprising C5+ hydrocarbons from the conversion effluent; and exposing at least a portion of the light paraffin stream together with an oxygenate co-feed to a second conversion to form an upgraded effluent comprising aromatics.

U.S. Pat. No. 4,835,329 A discloses a process for the production of alkylate and etherate rich high octane gasoline streams comprising the etherification to produce MTBE and TAME in the presence of a high stoichiometric excess of methanol followed by the conversion of unreacted methanol in contact with zeolite-type catalyst in the presence of aromatics to produce alkylated aromatics in gasoline.

CN 11151884 A discloses a method for alkylation of benzene with methanol aromatics production of high octane gasoline approach, especially using a supported metal oxide-modified HZSM-5 catalyst for benzene alkylation reaction with methanol, the production mainly containing toluene, xylene aromatic hydrocarbons of higher octane. This citation is therefore concerned with a post conversion or upgrading reactor by benzene alkylation with an oxygenate, methanol, for production of high octane of high octane gasoline aromatics.

CN 104419441 A discloses to a light aromatic with an alcohol/ether oxygenate alkylated to produce a high octane gasoline blending component. Benzene (the light aromatic) is added to the top of an alkylation reactor, while methanol or dimethyl ether (DME) is added evenly to the different beds of catalysts of the reactor.

None of the above citations disclose the provision of an oxygenate-to-gasoline reactor, in particular a MTG reactor comprising a fixed bed of catalyst, which is operated adiabatically, and in which the oxygenate is provided upstream the fixed bed, while aromatics are added farther downstream along the fixed bed(s) where the methanol concentration has decreased significantly.

SUMMARY

It is an object of the present invention to provide a process and plant for increasing aromatics in an MTG reactor converting oxygenates to raw gasoline, without increasing durene level in the produced raw gasoline and thereby in the downstream gasoline product, or even reducing the durene level therein.

It is another object of the present invention to provide a process and plant for producing a gasoline product from the raw gasoline with further integration of an upgrading reactor for converting C3-C4 to aromatics in the distillation section with the upstream MTG section, while at the same time also increasing the yield and octane number of the gasoline product.

These and other objects are solved by the present invention.

Accordingly, in a first aspect the invention is a process for converting an oxygenate feed stream, the process comprising the steps of:
conducting the oxygenate feed stream to an oxygenate-to-gasoline reactor under the presence of a fixed bed of catalyst active for converting oxygenates in the oxygenate feed stream into a raw gasoline stream comprising C3-C4 paraffins and C5+ hydrocarbons said oxygenate feed stream being added to the oxygenate-to-gasoline reactor at a point upstream said fixed bed of catalyst, suitably at the top of the oxygenate-to-gasoline reactor;
adding an aromatic stream to the oxygenate-to-gasoline reactor; wherein the oxygenate-to-gasoline reactor is a MTG reactor having arranged along its length a fixed bed or a plurality of successive fixed beds comprising the catalyst, the extension along the length of the MTG reactor of said fixed bed or plurality of successive fixed beds defining a total bed length;
the process further comprising:
operating the MTG reactor adiabatically and adding the aromatic stream at 40-80% of the total bed length, such as at 50-70% of the total bed length, e.g. 60% of the total bed length.

It would be understood, that percentages of the total bed length correspond to downstream direction in the MTG reactor, i.e. the percentages are distances from the reactor inlet. For instance, 50-70% of the total bed length corresponds to a portion of the most downstream half of the MTG reactor.

Suitably, the step of adding the aromatic stream is conducted in between successive fixed beds.

The addition of aromatics in the MTG reactor inherently magnifies the overlap zone, which is the region where aromatics are present together with the oxygenate, e.g. methanol and/or dimethyl ether, and olefins. In the overlap zone, formation of coke and coke precursors take place, as described farther above. In the best scenario, the addition of aromatics would not lead to an increase in methylation index and thereby in durene selectivity. However, adding more aromatics in the MTG reactor leads to more aromatics out of the MTG reactor, hence even if the methylation index does not increase, it would be expected to have higher aromatics and higher durene levels in the raw gasoline for that reason alone. Methylation index denotes how many methyl groups, on average, are attached to the aromatic rings and is the determining factor for how much durene (1,2,4,5-tetramethylbenzene)—which is undesired in the raw gasoline and further downstream in the gasoline product—will be in the aromatics fraction provided equilibrium is established with respect to transalkylation and isomerization.

Now, by adding the aromatic stream at some distance from the reactor inlet, namely the above recited 40-80% or 50-70% total bed length, the methanol concentration is sufficiently low so that extensive methylation of aromatics is no longer an issue. Due to the exothermicity of the methanol conversion, the addition of the aromatics is also in a region of the MTG reactor where the temperature is higher and thereby there is significant activity for transalkylation reactions. This results in reduction of durene levels despite that the aromatic fraction increases due to the addition the aromatic stream. The added aromatic stream acts therefore as quench-in "transalkylation agent" e.g. by durene and toluene being converted to trimethylbenzene and xylene, thereby increasing aromatics/octane in the raw gasoline without increasing the durene level. Rather, the durene concentration is even reduced.

As used herein, the term "C3-C4 paraffins" is also referred to as "LPG". The term "LPG" means liquid/liquified petroleum gas, which is a gas mixture mainly comprising propane and butane, i.e. C3-C4; LPG may also comprise i-C4 and a minor portion of olefins.

As used herein, the term "integration" means that: a number of the unit operations pertaining to a stand-alone upgrading reactor in the distillation section are already available in the MTG loop; and/or that process conditions, particularly pressure, in the upgrading reactor correspond to process conditions in the MTG loop; and/or there is a reduction of equipment size and energy consumption figures in the MTG loop by adapting the upgrading reactor in the distillation section. More generally, the term "integration" means providing synergy of the MTG loop (MTG section) and distillation section of the process and plant.

As used herein, the octane number is the Research Octane Number, RON, measured according to ASTM D-2699.

As used herein, the term "comprising" may also include "comprising only" i.e. "consisting of".

As used herein, the term "suitably" is used interchangeably with the term "optionally" and thus may be given the meaning of: a particular embodiment.

The MTG process for producing gasoline is well-known, as for instance disclosed in U.S. Pat. Nos. 4,788,369, 4,481,305 or 4,520,216. During the production of gasoline by the well-known MTG process, the LPG fraction typically constitutes between 15 and 20 wt % of the gasoline product slate. LPG has normally a low value and in the MTG process the value is even lower, because it is very far from specifications, for instance also by the presence of up to about 10 wt % olefins. The gasoline product (C5+ hydrocarbons) is a complex hydrocarbon mixture, comprising e.g. C5-C10 hydrocarbons, and it is known that aromatics contribute to a higher octane number of the gasoline product.

Adding aromatics to the MTG reactor is highly counter-intuitive, since it is well-established in the art that undesired formation of coke and coke precursors, as well as methylation and alkylation, take place where aromatics are present together with oxygenates such as methanol and/or dimethyl ether (DME), and olefins. This is believed to have an immediate impact in reducing catalyst cycle length/time in the MTG reactor. The aromatics fed to the MTG reactor are also found in the effluent of the MTG reactor, for instance as methylated aromatic compounds which become part of the raw gasoline stream.

The catalyst cycle time/length is the length of the period where the catalyst exhibits proper catalytic activity. As deactivation by coke formation takes place, the amount of active catalyst available for conversion of oxygenate into gasoline is reduced. It is important to avoid slip of unconverted oxygenates as contents of oxygenates would complicate the separation step for obtaining the gasoline product. After such a cycle time, the catalyst must be regenerated by burning off the coke. Short catalyst cycle time means therefore that an expensive type of reactor must be employed e.g. with continuous regeneration of catalyst circulated between reactor and regenerator, or that several reactors in parallel must be employed with frequent shifts in operation mode (oxygenate conversion or regeneration) and being equipped with complex control.

By the present invention, the addition of an aromatic stream containing aromatic compounds such as benzene, enables an increase in the octane number of the raw gasoline, and thereby in the final gasoline product. While there may be an associated penalty in terms of cycle time reduction in the MTG reactor, this is outweighed by the increase in the octane number, as well as the reduction of inlet temperature to the MTG reactor. It has namely been found that the addition of aromatics in the MTG reactor according to the present invention has a similar effect as does co-feeding of higher alcohols, namely that of enabling a reduction in the inlet temperature of the MTG reactor, thereby providing both operational flexibility and extending ultimate catalyst longevity in the MTG reactor. This signifies that the onset of oxygenate conversion, e.g. methanol conversion, starts at a temperature significantly below corresponding to operation with the oxygenate alone, e.g. no co-feeding of aromatics. Furthermore, the catalyst lifetime in the MTG reactor is extended due to the combined feed thereto (oxygenate and aromatics) becoming more reactive thereby providing more freedom and thus flexibility in the selection of ideal relationship of inlet to outlet temperatures in the MTG reactor.

In an embodiment, the process further comprises combining, e.g. co-feeding, a portion of the aromatic stream with the oxygenate feed stream. Hence, a portion of the aromatic stream may be diverted and co-fed with the oxygenate feed stream. The portion of the aromatic stream may be combined with the oxygenate feed stream outside the oxygenate-to-gasoline reactor, e.g. by combining the aromatic stream with the oxygenate feed prior to being mixed with a recycle stream of the MTG loop, or by combining the aromatic stream with the oxygenate feed after being mixed with a recycle stream of the MTG loop e.g. at the inlet of the oxygenate-to-gasoline reactor.

In an embodiment, the catalyst in the MTG reactor is a zeolitic catalyst having an MFI framework such as ZSM-5, for instance ZSM-5 in its hydrogen form (HZSM-5) or a Zn-modified ZSM-5 optionally further comprising 1-5 wt % of a phosphorous compound, such as 3 wt % P; and wherein the temperature in the MTG reactor is 280-400° C., the pressure is in the range 15-25 bar abs; and optionally the weight hour space velocity (WHSV) is 1-6, such as 1-2, for instance 1.5 or 1.6. Suitably also, the zeolitic catalyst has a $SiO_2/Al_2O_3$ (silica to alumina) ratio of 50-300.

As used herein, the term "MFI structure" means a structure as assigned and maintained by the International Zeolite Association Structure Commission in the Atlas of Zeolite Framework Types, which is at http://www.iza-structure.org/databases/or for instance also as defined in "Atlas of Zeolite Framework Types", by Ch. Baerlocher, L. B. McCusker and D. H. Olson, Sixth Revised Edition 2007.

It has been found that when using a phosphorous compound, i.e. P-doped zeolitic catalyst, such as zeolitic catalyst containing 1-3 wt % P, and having a low acidity such as a silica to alumina ratio of 280, the zeolitic catalyst is more tolerant to the aromatics being added. Hence, on a relative basis (compared to when only using methanol feed), durene level is not noticeably changed. Furthermore, by operating the MTG reactor adiabatically as well as by reducing space velocity (WHSV) to 1-2, for instance 1.5 or 1.6, corresponding to industrial conditions, it is possible to bring the operation closer to equilibrium and thereby further reduce durene content.

In an embodiment, the process further comprises:
separating from the raw gasoline stream a gasoline product stream comprising the C5+ hydrocarbons and a stream comprising C3-C4 paraffins;
conducting the stream comprising C3-C4 paraffins or a portion thereof to an upgrading reactor under the presence of a catalyst active for converting the C3-C4 paraffins into the aromatic stream, in which the aromatic stream comprises any of benzene, toluene or xylene, or combinations thereof, such as an aromatic stream comprising benzene, toluene and xylene (BTX).

The step of separating from the raw gasoline stream a gasoline product stream comprising the C5+ hydrocarbons and a stream comprising C3-C4 paraffins is suitably conducted in a LPG splitter i.e. a fractionation column such as a distillation column. The C3-C4 paraffins, e.g. LPG, is withdrawn as the overhead stream thereof, while the gasoline product stream is withdrawn as the bottom stream. The LPG splitter is also referred as stabilizer and the gasoline product stream as stabilized gasoline. This stabilized gasoline is optionally upgraded by further increasing its octane number via subsequent isomerization, e.g. hydroisomerization (HDI). Suitably, prior to the HDI step, the stabilized gasoline is conducted to a fractionation column for separating light gasoline as overhead stream, fuel oil as bottom stream and intermediate stream as the stabilized gasoline stream for the HDI step.

The material catalytically active in HDI typically comprises an active metal (either elemental noble metals such as platinum and/or palladium or sulfided base metals such as nickel, cobalt, tungsten and/or molybdenum), an acidic support (typically a molecular sieve showing high shape selectivity, and having a topology such as MFI, MEL, MOR, FER, MRE, MWW, AEL, TON and MTT) and a refractory support (such as alumina, silica or titania, or combinations thereof). HDI conditions involve a temperature in the interval 250-400° C., a pressure in the interval 20-150 bar, and a liquid hourly space velocity (LHSV) in the interval 0.5-8.

The low value LPG is utilized to improve gasoline product yield and octane number. The LPG fraction of the raw gasoline is processed in an upgrading reactor for thereby converting the LPG fraction to almost exclusively BTX, thereby providing a path for significantly improving gasoline product yield by 5-10% and octane number by 1-3 numbers, while at the same time complying with specifications of aromatic contents in the gasoline product. For instance, the gasoline product yield is increased from 80 to 90% and simultaneously the octane number is increased from about 93 to 94 or 95, which represents a significant, valuable change.

The present invention avoids also the need to resort to conventional upgrading of the LPG fraction of the gasoline product resulting from the use of MTG technology, which normally would require major and costly steps involving hydrogenation and distillation, so the LPG is made compliant with standard LPG specifications, and which would also entail significant losses connected to meeting the right C3/C4 balance in the LPG.

Suitably, the aromatic stream comprising BTX is a BTX-rich stream. By BTX-rich stream is meant 80 wt % or more BTX, for instance 90, 95 wt % or more BTX.

The amount of aromatic compounds in the entire aromatic stream comprising BTX with respect to the oxygenate feed stream, e.g. methanol feed stream, entering the MTG reactor, yet prior to any mixing with a recycle stream in the MTG loop, is suitably less than 4 wt %, such as 0.5, 1, 1.5, 2, 2.5, 3, 3.5 wt % of the methanol feed. It has been found that below 4 wt %, the reduction in cycle length is less pronounced. The above amount of below 4 wt % comes on top of the inherent amount of aromatics present in the recycle stream, typically amounting to 1-2 wt % of the methanol feed stream as a result of incomplete separation upstream in the product separator, e.g. high-pressure separator of the MTG loop. For instance, when returning the entire aromatic stream comprising BTX to the MTG reactor, there may be about 5 wt % aromatics in the methanol feed after mixing with the recycle stream, corresponding to 3.5 wt % of BTX and 1.5 wt % inherent amount of aromatics in the recycle stream.

In an embodiment, the aromatic stream is a benzene-rich stream (B-rich stream) which is separated from the aromatic stream comprising BTX.

By B-rich stream is meant 50 wt % or more benzene, for instance 60, 80, 90, 95 wt % or more benzene.

This further enables easier compliance with gasoline product specifications, which impose ceilings both with respect to aromatic content and benzene content in particular.

It has also been found, that benzene, along with methanol fed to the MTG reactor becomes methylated by the unconverted methanol in the MTG reactor. Thus, benzene, undesired in excessive amounts in the gasoline product, is advantageously converted in the MTG reactor forming higher aromatics, such as toluene, xylenes, tri- and tetramethylbenzenes, thereby not altering the methylation index. The methylation index is the determining factor for how much durene (1,2,4,5-tetramethylbenzene) will be in the aromatics fraction provided equilibrium is established with respect to transalkylation and isomerization.

For the purposes of the present application, the amount of benzene in the benzene-rich stream with respect to the oxygenate feed stream, e.g. methanol, entering the MTG reactor, yet prior to any mixing with a recycle stream, is 0.5-1.5 wt % of the methanol feed, such as 0.6-1.2 wt % of methanol feed. For instance, the benzene-rich stream is suitably about 0.6 wt % of the methanol feed. Again, this amount comes on top of the inherent amount of aromatics present in e.g. methanol, often about 1-2 wt % which results from incomplete separation upstream in the product separator, e.g. high-pressure separator of the MTG loop.

The benzene-rich stream is thus added in predetermined amounts to approach, but not exceed, aromatics and benzene specifications in the gasoline product while improving gasoline product yield and octane number, and at the same time the risk of coking and thereby reduction of cycle length in the MTG reactor, is reduced.

In an embodiment, the oxygenate stream is methanol and/or dimethyl ether (DME). In another embodiment, the oxygenate feed stream is e-methanol (electrified methanol), i.e. methanol which is produced from synthesis gas prepared by using (supplying) electricity from renewable sources such as hydropower, wind or solar energy, e.g. eMethanol™. Hence, according to this embodiment the synthesis gas may be prepared by combining air separation, autothermal reforming or partial oxidation, and electrolysis of water, as disclosed in Applicant's WO 2019/020513 A1, or from a synthesis gas produced via electrically heated reforming as for instance disclosed in Applicant's WO 2019/228797. Thereby, an even more sustainable approach for the production of raw gasoline, in particular gasoline product, is achieved. While methanol can be produced from many primary resources (including biomass and waste), in times of low wind and solar electricity costs, the production of eMethanol™ enables a sustainable front-end solution. The synthesis gas, which as is well-known in the art, is a mixture comprising mainly hydrogen and carbon monoxide, for methanol synthesis may also be prepared by combining the use of water (steam) electrolysis in an alkaline or PEM electrolysis unit or a solid oxide electrolysis cell (SOEC) unit, thereby generating hydrogen, and the use of an SOEC unit for thereby generating carbon monoxide from a $CO_2$-rich stream.

In an embodiment, the process further comprises adding one or more sulfur compounds to the stream comprising C3-C4 paraffins being conducted to the upgrading reactor, and wherein the content of the one or more sulfur compounds, such as $H_2S$, is 10-1000 ppmv, such as 10-100 ppmv.

Thereby losses due to conversion of LPG to methane and ethane as well as higher (C9+) aromatics are significantly suppressed Furthermore, given that LPG may contain minor amounts of olefins, e.g. up to 10 wt % C3/C4-olefins, at the high operating temperatures of the upgrading reactor, for instance 500-600° C., the risk of corrosion of metal parts therein, in particular metal dusting, is also reduced. Furthermore, the LPG fraction is thereby efficiently converted into a BTX product with only minimum formation of higher (C9+) aromatics and with a strongly reduced selectivity to methane in the presence of small amounts of sulfur, such about 50 ppm, e.g. as $H_2S$.

In an embodiment, the raw gasoline stream comprises C2− compounds and the process further comprises prior to the step of separating from the raw gasoline stream a gasoline product stream comprising the C5+ hydrocarbons and a stream comprising C3-C4 paraffins:

conducting the raw gasoline stream to a de-ethanizer for generating a fuel gas stream comprising the C2 compounds and optionally a sulfur compound, such as $H_2S$.

Where a sulfur compound such as $H_2S$ is present in the fuel gas, this is suitably conducted to the HDI step. Accordingly, in a particular embodiment the gasoline product stream comprising the C5+ hydrocarbons is conducted to a hydroisomerization (HDI) step, optionally after being conducted to a fractionation step e.g. in a distillation column; the fuel gas stream comprising the C2− compounds comprises a sulfur compound, such as $H_2S$; and the fuel gas stream is added to the HDI step, suitably by admixing with the gasoline product stream prior to entering the HDI step. The content of C2-compounds in the raw gasoline stream is for instance 10 wt % or less.

By conducting the fuel gas stream comprising a sulfur compound from the de-ethanizer to the HDI step, i.e. to the HDI reactor, the catalyst therein is sulfided without resorting to external sulfur sources. Further integration in the process and plant is thereby achieved. The C2− compounds in the fuel gas stream are suitably withdrawn after the HDI step, for instance by simply arranging a product separator downstream the HDI reactor.

HDI conditions are recited farther above.

In an embodiment, a stream rich in toluene and optionally xylene (T/X-rich stream) as well as a stream rich in paraffins, isoparaffins and olefins (P/I/O-rich stream) optionally also comprising unconverted LPG lower hydrocarbons and C5+ hydrocarbons, are separated from the aromatic stream comprising BTX, and at least one of the T/X-rich stream or a portion thereof and the P/I/O-rich stream or a portion thereof, is added to the raw gasoline stream, suitably prior to conducting the raw gasoline stream to the de-ethanizer; and/or—the P/I/O-rich stream or a portion thereof is added to the MTG reactor.

The more aromatics being added to the MTG reactor, the more aromatics are present in the MTG reactor effluent and thereby in the raw gasoline stream. Hence, even if the methylation index does not increase, higher aromatics and higher durene levels in the raw gasoline product would otherwise be expected. By diverting the T/X-rich stream to the raw gasoline stream, the durene therein is effectively further reduced. The T/X-rich stream is suitably added together with the P/I/O-rich stream, the C5+ components contained herein further reducing the concentration of durene in the gasoline product. Suitably, one or more sulfur compounds, such as $H_2S$, are also added.

The P/I/O-rich stream or a portion thereof may optionally be returned to the MTG reactor in which at least the olefin compounds contained therein will be partially converted into raw gasoline. The P/I fraction will largely function as a heat sink, due to its relatively high heat capacity, thereby reducing the amount of recycle stream used as diluent and reducing recycle compression energy. Accordingly, olefins are purposely utilized to produce even more C5+ hydrocarbons while at the same time exploiting the rather high heat capacity of the C2-C6 compounds in the P/I-fraction of the P/I/O-rich stream. The P/I/O-rich stream is suitably added to the MTG reactor by for instance combining it with the oxygenate feed stream prior to any mixing with a recycle stream. The P/I/O-rich stream may also be combined with the oxygenate feed stream after the mixing with the recycle stream, for instance immediately upstream the MTG reactor i.e. at the MTG reactor inlet.

By T/X-rich stream is meant 50 wt % or more of T/X, for instance 60, 80, 90, 95 wt % or more T/X.

By P/I/O-rich stream is meant 50 wt % or more of P/I/O, for instance 60, 80, 90, 95 wt % or more P/I/O.

In an embodiment, the catalyst in the upgrading reactor is a zeolitic catalyst having an MFI framework containing 0.1 to 10 percent by weight of a zinc compound, for instance wherein the zeolitic catalyst is ZSM-5, the zinc compound is metallic and/or oxidic zinc, and optionally the zeolitic catalyst further comprises 1-5 wt % of a phosphorous compound, e.g. 1-5 wt % P.

In another particular embodiment, the zeolitic catalyst is H-ZSM.5 having a silica to alumina ratio of 30-100 such as about 40 and comprises 3-7 wt % Zn such as about 5 wt % Zn.

In the upgrading reactor, $C_{2, \ldots, 4, 5, \ldots}$ paraffins are converted into a mixture of essentially BTX/olefins and light paraffins.

In an embodiment, wherein the temperature in the upgrading reactor is 500-650° C., and the pressure is in the range 3-25 bar abs; suitably wherein the temperature is 500-550° C. such as about 525° C. and the pressure 15-25 bar abs, such as about 20 bar abs.

Suitably, the weight hour space velocity (WHSV) is 3-6, such as 3.

Suitably also, the upgrading reactor is operated adiabatically.

The conversion of the paraffins in the upgrading reactor is endothermic. High temperatures, as recited above, are therefore required to activate paraffins: the first step is dehydrogenation, producing olefins which subsequently react to form aromatics/olefins/paraffins.

By adding sulfur, the harsh conditions imposed in the upgrading reactor in terms of i.a. the high temperatures, dry conditions i.e. no steam being added or being generated, and olefins as intermediates/product and even present in feed, is counteracted: sulfur provides protective properties with respect to corrosion (materials selection), and its selectivity directing properties, reducing methane and heavy oil formation, as described farther above.

By operating at the lower temperature range, for instance at 525° C., and at the higher pressure range, for instance 15 bar abs, the content of benzene in the BTX mixture is shifted towards a BTX mixture having less benzene. Also, at these elevated pressures, selectivity towards BTX increases, producing essentially BTX+ paraffins, and at the same time the content of olefins is reduced i.e. olefin selectivity declines. The olefins formed are low olefins: C2=to C5=(only little C6=+ is formed). Therefore, these olefins may for instance be returned to the distillation section, with the C3=/C4=, eventually, being returned to the upgrading reactor through the LPG splitter. Thus, there will be essentially no olefins in the BTX fraction, hence olefins are not co-fed in the MTG reactor. So, the elevated pressure helps increasing the BTX yield and reduce the coking rate in the upgrading reactor. The olefins may also be returned to the MTG reactor, as recited farther above.

By way of example, the distribution of the BTX mixture is shifted from B:T:X 32:55:13 wt % when operating at low pressure (3 bar abs) and 550° C., to B:T:X 17:50:33 wt % when operating at higher pressure (15 bar abs) and 525° C. Hence, there is a significant reduction of benzene. This is important, since benzene in particular is an issue imposing a limit as to how much BTX can be added to the raw gasoline and thus how much is present in the gasoline product.

Furthermore, by operating the upgrading reactor at higher pressures, for instance at about 20 bar abs, expedient and easy integration with the MTG reactor is enabled, since the MTG reactor normally operates at the same pressure, i.e. at about 20 bar abs.

In an embodiment, the upgrading reactor is an electrically heated reactor (e-reactor); optionally operated adiabatically and optionally also, operated in once-through mode.

In an e-reactor, electrical resistance is used for generating the heat required for the conversion of the paraffins in the upgrading reactor. In particular, when using the e-reactor, electricity from green (renewable) resources may be utilized, such as from electricity produced by wind power, hydropower, and solar sources, thereby further minimizing the carbon footprint. Hence, by the present invention not only the methanol used as oxygenate in the oxygenate feed stream to the MTG reactor may be produced from renewables sources as e-methanol, but renewable sources are also used for the operation of the upgrading reactor. For a description of how to configure the e-reactor, reference is given to applicant's WO 2019/228797 A1

In a particular embodiment, the e-reactor is operated adiabatically and optionally in once-through mode. Due to the endothermic nature of the conversion, there is a temperature decrease of about 100° C. or less, e.g. 75° C., across the region of the e-reactor comprising the catalyst. For instance, from 600° C. to 525° C., and/or from 525° C. to 450° C. Operation in once-through mode enables high conversion yields, for instance 50-60%, while at the same time avoiding the need for recycling the reactant i.e. C3-C4 paraffins.

In an embodiment, the step of conducting the stream comprising C3-C4 paraffins to an upgrading reactor under the presence of a catalyst active for converting the C3-C4 paraffins into the aromatic stream, does not comprise co-feeding an oxygenate stream to the upgrading reactor.

It has been found that while the addition of an oxygenate stream to the upgrading reactor, i.e. co-feeding an oxygenate stream, for instance methanol, would result in its conversion to hydrocarbons, importantly also, water (steam) is produced. This conveys the high risk of steaming the catalyst, in particular a ZSM-5 catalyst being used in the upgrading reactor, which at the high temperatures e.g. 500-650° C. used for its operation, irreversibly deactivates the catalyst. By purposely avoiding the co-feeding of the oxygenate stream, the upgrading reactor is able to operate for longer times, as there is no such catalyst deactivation.

In an embodiment, the process further comprises, prior to the step of adding the aromatic stream with the oxygenate feed stream:
conducting the aromatic stream comprising benzene, toluene and xylene (BTX) to a buffer tank, i.e. BTX buffer tank.

The catalyst in the upgrading reactor may require frequent regeneration. However, by adapting the BTX buffer tank, the fluctuations are leveled out, thereby enabling an aromatics reserve for continuously maintaining aromatics including benzene levels close to the limit according to specifications, e.g. up to about 35 vol % in the gasoline product. Hence, at any time it is ensured that the aromatics "freeboard" with respect to increasing yield and octane is exploited to its maximum. It has been found that except for first few cycles, aromatics are in deficit relative to maximum content according to gasoline specifications (up to the above limit). Given that the increase in octane number of the gasoline product is mainly the result of its aromatics content, the buffer tank enables that the aromatics content is up to the above specifications and thereby the octane number is also continuously maintained at a high level.

In a second aspect, the invention encompasses also a plant, i.e. process plant, for carrying out the process according to any of the above embodiments.

DETAILED DESCRIPTION

Figure 1:
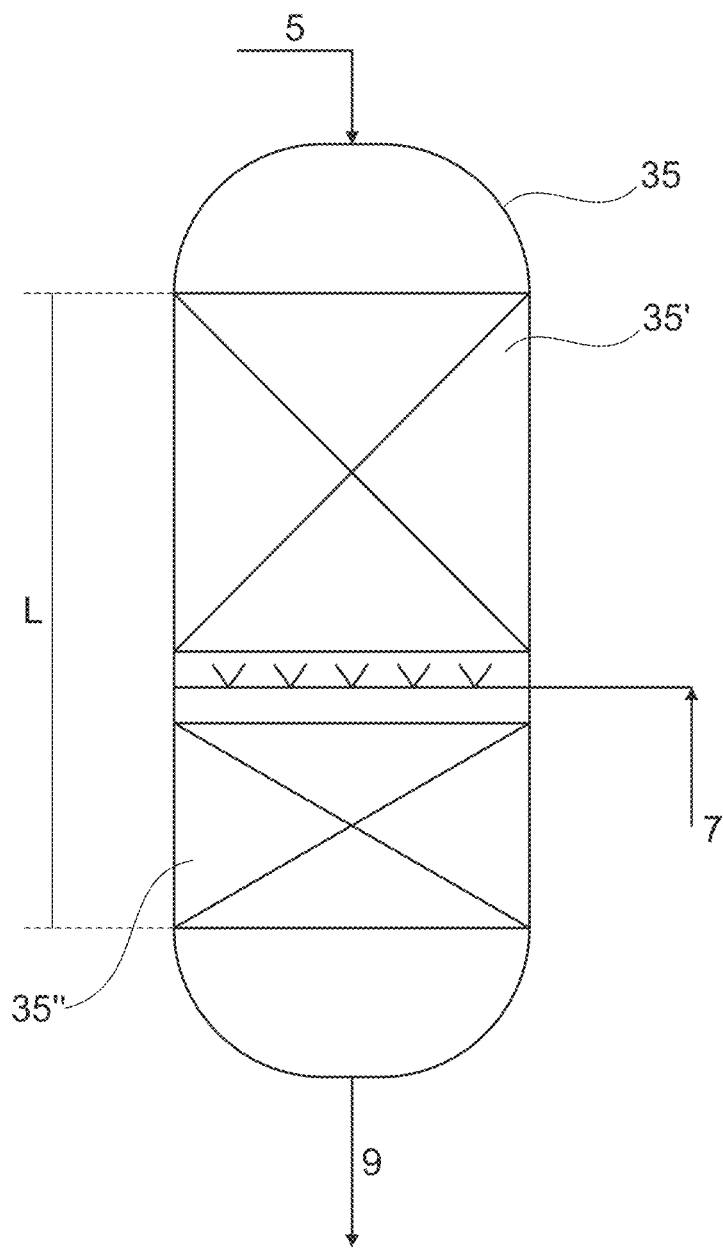
FIG. 1 shows a schematic drawing of the addition of an aromatic stream to a MTG reactor according to an embodiment of the present invention.

With reference to FIG. 1, MTG reactor 35 of a MTG section/MTG loop (not shown) comprises two successive fixed beds 35', 35" defining a total bed length "L" and comprising a catalyst active for the conversion of oxygenates, e.g. methanol, to raw gasoline. The oxygenate feed stream 5, enters at one end of the MTG reactor, here at the top, thus at a point upstream said fixed bed of catalyst 35', 35", while the aromatic stream 7 is added at 40-80% of the total bed length "L", as schematically depicted in the figure. An aromatic stream 7 is provided in between the fixed beds 35', 35" at a significant portion downstream of the reactor inlet, e.g. at post-methanol conversion point where the temperature is high, thus enabling significant activity for transalkylation reactions, and thereby increasing aromatics/octane in the effluent stream 9 comprising C3-C4 paraffins and C5+ hydrocarbons without increasing durene level, or even reducing the durene level.

Figure 2:
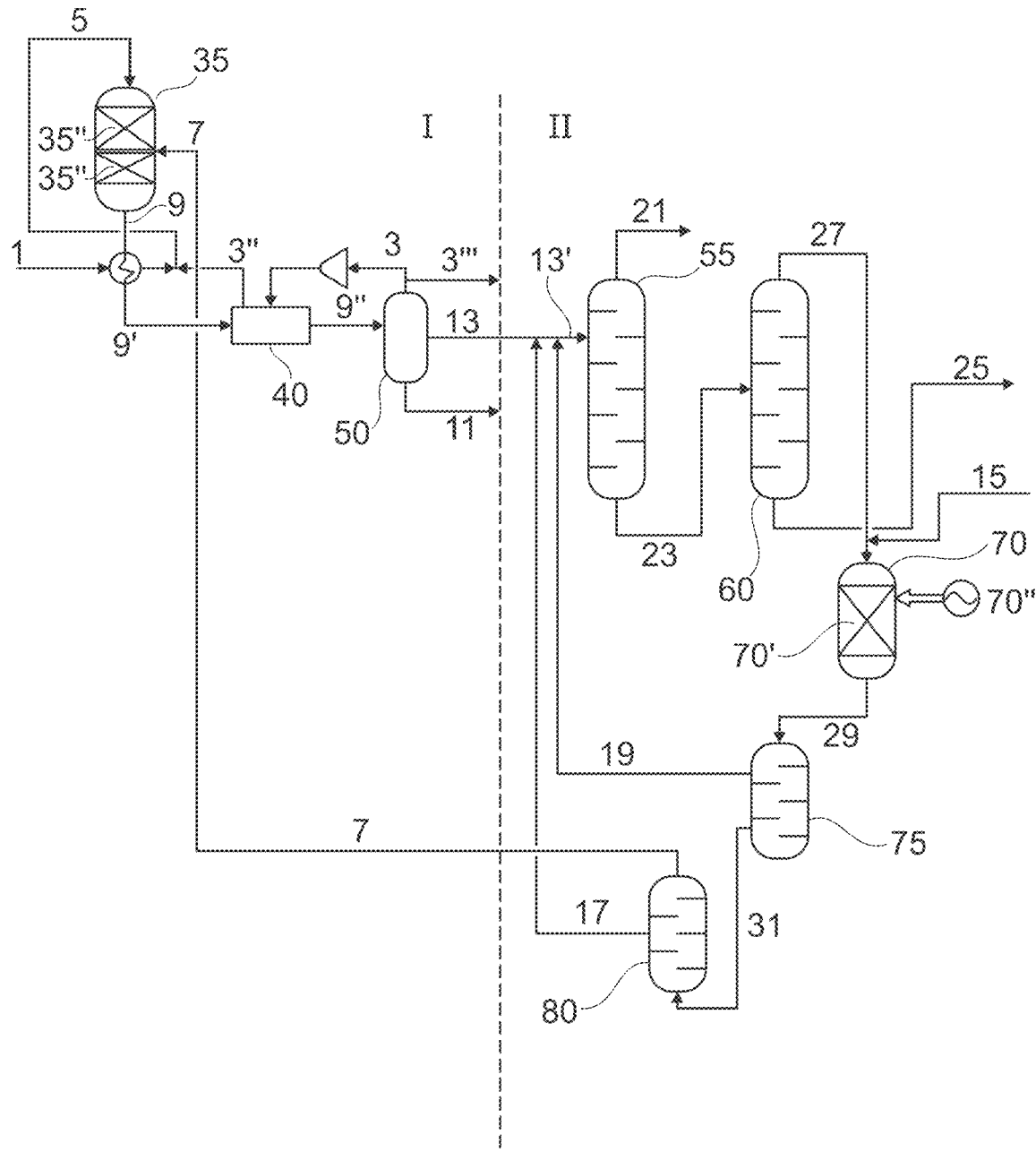
FIG. 2 shows a process and/or plant layout including the MTG section and downstream distillation section, the latter incorporating an upgrading reactor in accordance with another embodiment of the present invention.

Now with reference to FIG. 2, a process/plant 10 comprising a MTG section (MTG loop) I and distillation section II, according to the division depicted by the stippled line in the figure. An oxygenate stream, e.g. e-methanol stream 1, is preheated in feed-effluent heat exchanger 30 and combined with preheated overhead recycle stream 3", thereby forming oxygenate feed stream 5. A benzene-rich stream (B-rich stream) 7 generated from downstream separator 80 is added to MTG reactor 35, as e.g. also depicted in FIG. 1. The MTG reactor 35 has arranged therein a catalyst 35' 35" active for converting oxygenates in the oxygenate feed stream to a raw gasoline stream comprising C3-C4 paraffins and C5+ hydrocarbons. The effluent stream 9 from the MTG reactor 35 comprises therefore C3-C4 paraffins and C5+ hydrocarbons and is cooled by delivering heat in the feed-effluent heat exchanger 30. The cooled effluent stream 9' is further cooled in cooling section 40, for instance by supplying heat in an additional heat exchanger (not shown) used for preheating overhead recycle stream 3' from recycle compressor 45, as well as by passing through an optional air cooler (not shown) and heat exchanger using cooling water as heat exchanging medium (not shown). The thus cooled effluent stream 9" is conducted to a product separator 50, e.g. a high pressure separator, thereby forming water stream 11, raw gasoline stream 13 as well as overhead recycle stream 3 from which a fuel gas stream 3''' may be derived.

The raw gasoline stream 13 from the MTG loop I enters the distillation section II by combining it with a stream rich in toluene and optionally xylene (T/X-rich stream 17) as well as a stream rich in paraffins, isoparaffins and olefins (P/I/O-rich stream 19), which are separated from an aromatic stream comprising benzene, toluene and xylene (BTX) in downstream upgrading reactor 70 as explained farther below.

The raw gasoline stream 13', now mixed with the T/X-rich stream 17 and P/I/O-rich stream 19, enters a de-ethanizer 55 suitably in the form of a fractionating column, thereby separating a fuel gas stream 21 comprising C2-compounds and optionally also a sulfur compound, e.g. $H_2S$. The bottom stream 23 of the de-ethanizer 55, now containing mainly C3-C4 paraffins e.g. LPG and C5+ hydrocarbons, is conducted to LPG splitter 60 suitably in the form of a fractionating column, for thereby finally separating from the raw gasoline stream 13 a bottom stream 25 as the gasoline product stream comprising the C5+ hydrocarbons and an overhead stream 27 comprising C3-C4 paraffins, e.g. LPG. The gasoline product stream 25 may be optionally further refined by conducting it to a gasoline splitting column and HDI unit (not shown) for thereby further increasing the octane number of the gasoline product, thus resulting in an upgraded gasoline product.

The overhead stream 27 comprising C3-C4 paraffins, e.g. LPG, is conducted to an upgrading reactor 70 under the presence of a catalyst 70' active for converting the C3-C4 paraffins into an aromatic stream 29 comprising benzene, toluene and xylene (BTX). Suitably, a feed-effluent heat exchanger (not shown) is also provided for preheating stream 27. The upgrading reactor is an electrically heated reactor (e-reactor) using power 70" generated from a renewable source such as wind or solar energy. A sulfur compound such as $H_2S$ is suitably added as stream 15 to the upgrading reactor 70. There is no co-feeding of an oxygenate stream to the upgrading reactor 70.

The aromatic stream comprising BTX 29 is conducted to a downstream separator 75, suitably in the form of a fractionating column, for thereby forming the P/I/O-rich stream 19 which is withdrawn and combined with the raw gasoline product 13 from the MTG loop. A stream 31 comprising mainly BTX is also withdrawn and conducted to a second separator 80, suitably in the form of a fractionating column, for thereby forming the T/X-rich stream 17 which is withdrawn and combined with the raw gasoline 13, as well as the B-rich stream 7 which is added to the MTG reactor 35.

EXAMPLE

Figure 3:
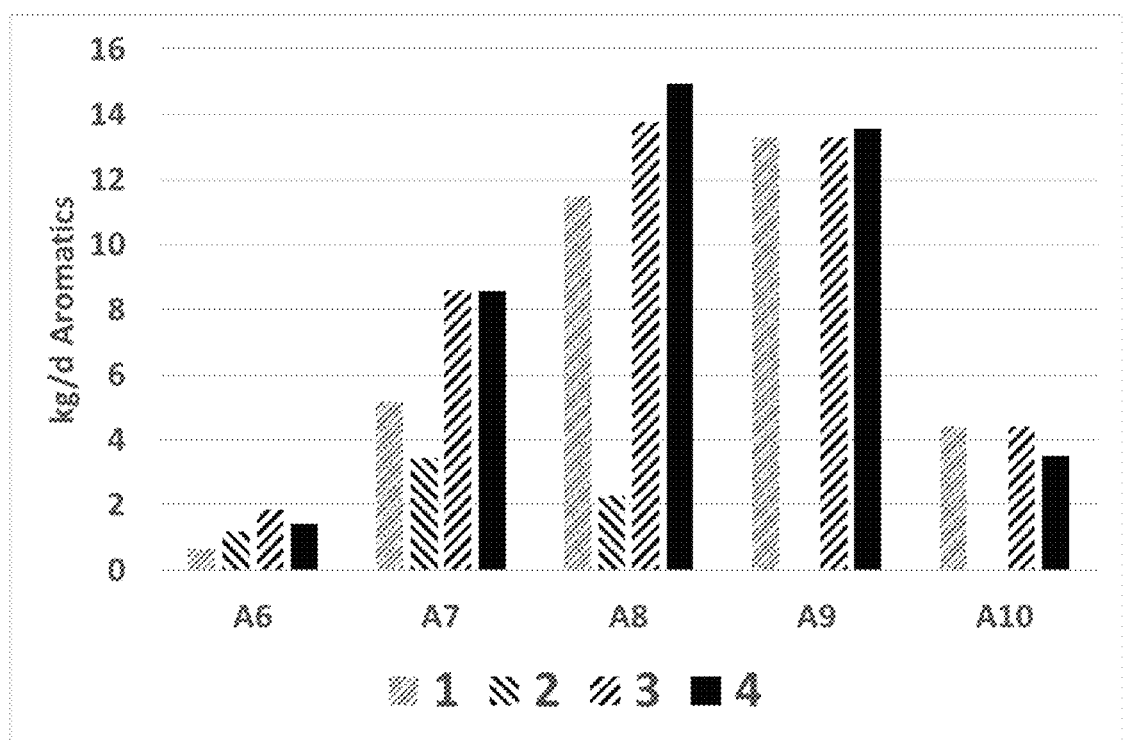
FIG. 3 shows the effect of adding the aromatic stream as a BTX stream to the MTG reactor as depicted in FIG. 1.

FIG. 3 shows the effect of quench co-feed of a BTX-rich stream post methanol conversion zone, thus where methanol concentration has decreased significantly in the MTG reactor in accordance with FIG. 1. In a methanol-to-gasoline pilot plant producing approx. 100 kg per day of raw gasoline of which aromatics constitutes approx. 35 wt %, the LPG fraction is processed in an upgrading reactor to produce approx. 7 kg/d BTX which is injected to the MTG reactor (gasoline synthesis reactor) comprising a ZSM-5 catalyst and at a point corresponding to 60% of the total ZSM-5 catalyst bed length. By transalkylation reactions taking place in the high-temperature zone of the adiabatic reactor, the amount of heavier substituted aromatic components (tetramethylbenzenes) are significantly reduced. By reference to FIG. 3, the aromatic compound A6 denotes benzene, A7: toluene, A8: xylenes, A9: trimethylbenzenes, A10: tetramethylbenzenes of which 1,2,4,5-tetramethylbenzene, durene, typically constitutes 80-90%. Further, under each aromatic compound: "1" denotes the amount of aromatics produced if no BTX is added (prior art) to the MTG reactor; "2" denotes the amount of BTX injected to the gasoline reactor at 60% of the catalyst bed length—under A9 and A10, there is no column corresponding to "2" because "2" only contains benzene (B), toluene (T) and xylene (X), and essentially no tri- or tetramethylbenzenes; "3" denotes the calculated composition of the aromatic fraction, if no transalkylation reactions take place (equals "1"+"2"), and "4" denotes the actual aromatics composition resulting from equilibration under the prevailing reaction conditions (approx. 380-410° C. and 18 bar g), due to transalkylation reactions being operative. This demonstrates that the A10 fraction, of which durene typically constitutes about 80-90%, in the raw gasoline is reduced significantly, the A10 fraction being reduced from 4.3 kg/d to 3.5 kg/d out of which durene (1,2,4,5-tetramethylbenzene) constitutes approx. 3.8 kg/d and 3.0 kg/d, respectively. The total yield of raw gasoline has increased from approx. 100 kg/d to approx. 107 kg/d while the content of aromatics in the raw gasoline has increased from aprox. 35 wt % (prior art) to approx. 39 wt % according to the invention, thereby at the same time also improving the raw gasoline octane number.

The invention claimed is:

1. A process for converting an oxygenate feed stream, the process comprising the steps of:
conducting the oxygenate feed stream to an oxygenate-to-gasoline reactor under the presence of a fixed bed of catalyst active for converting oxygenates in the oxygenate feed stream into a raw gasoline stream comprising C3-C4 paraffins and C5+ hydrocarbons; said oxygenate feed stream being added to the oxygenate-to-gasoline reactor at a point upstream said fixed bed of catalyst;
adding an aromatic stream to the oxygenate-to-gasoline reactor; wherein the oxygenate-to-gasoline reactor is a methanol-to-gasoline (MTG) reactor having arranged along its length a fixed bed or a plurality of successive fixed beds comprising the catalyst, the extension along the length of the MTG reactor of said fixed bed or plurality of successive fixed beds defining a total bed length;
the process further comprising:
operating the MTG reactor adiabatically and adding the aromatic stream at 40-80% of the total bed length;
separating from the raw gasoline stream a gasoline product stream comprising the C5+ hydrocarbons and a stream comprising C3-C4 paraffins; and
conducting the stream comprising C3-C4 paraffins or a portion thereof to an upgrading reactor under the presence of a catalyst active for converting the C3-C4 paraffins into the aromatic stream, in which the aromatic stream comprises any of benzene, toluene or xylene, or combinations thereof.

2. The process according to claim 1, wherein said oxygenate feed stream is added at the top of the oxygenate-to-gasoline reactor.

3. The process according to claim 1, wherein the catalyst in the MTG reactor is a zeolitic catalyst having an MFI framework; and wherein the temperature in the MTG reactor is 280-400° C., the pressure is in the range 15-25 bar abs; and optionally the weight hour space velocity (WHSV) is 1-6.

4. The process according to claim 1, wherein the aromatic stream comprises benzene, toluene and xylene (BTX).

5. A process for converting an oxygenate feed stream, the process comprising the steps of:
conducting the oxygenate feed stream to an oxygenate-to-gasoline reactor under the presence of a fixed bed of catalyst active for converting oxygenates in the oxygenate feed stream into a raw gasoline stream comprising C3-C4 paraffins and C5+ hydrocarbons; said oxygenate feed stream being added to the oxygenate-to-gasoline reactor at a point upstream said fixed bed of catalyst;
adding an aromatic stream to the oxygenate-to-gasoline reactor; wherein the oxygenate-to-gasoline reactor is a methanol-to-gasoline (MTG) reactor having arranged along its length a fixed bed or a plurality of successive fixed beds comprising the catalyst, the extension along the length of the MTG reactor of said fixed bed or plurality of successive fixed beds defining a total bed length;
the process further comprising:
operating the MTG reactor adiabatically and adding the aromatic stream at 40-80% of the total bed length;
wherein the aromatic stream is a benzene-rich stream (B-rich stream) which is separated from an aromatic stream comprising BTX.

6. The process according to claim 1, wherein the oxygenate feed stream is methanol and/or dimethyl ether (DME).

7. The process according to claim 1, wherein the process further comprises adding one or more sulfur compounds to the stream comprising C3-C4 paraffins being conducted to the upgrading reactor, and wherein the content of the one or more sulfur compound is 10-1000 ppmv.

8. The process according to claim 1, wherein the raw gasoline stream comprises C2-compounds and the process further comprises prior to the step of separating from the raw gasoline stream a gasoline product stream comprising the C5+ hydrocarbons and a stream comprising C3-C4 paraffins:
conducting the raw gasoline stream to a de-ethanizer for generating a fuel gas stream comprising the C2 compounds and optionally a sulfur compound.

9. The process according to claim 1, wherein a stream rich in toluene and optionally xylene (T/X-rich stream,) as well as a stream rich in paraffins, isoparaffins and olefins (P/I/O-rich stream) optionally also comprising unconverted LPG lower hydrocarbons and C5+ hydrocarbons, are separated from the aromatic stream, and at least one of the T/X-rich stream or a portion thereof and the P/I/O-rich stream or a portion thereof, is added to the raw gasoline stream; and/or the P/I/O-rich stream or a portion thereof is added to the MTG reactor.

10. The process according to claim 1, wherein the catalyst in the upgrading reactor is a zeolitic catalyst having an MFI framework containing 0.1 to 10 percent by weight of a zinc compound.

11. The process according to claim 1, wherein the temperature in the upgrading reactor is 500-650° C., and the pressure is in the range 3-25 bar abs.

12. The process according to claim 1, wherein the upgrading reactor is an electrically heated reactor (e-reactor); optionally operated adiabatically and optionally also, operated in once-through mode.

13. The process according to claim 1, wherein the step of conducting the stream comprising C3-C4 paraffins to an upgrading reactor under the presence of a catalyst active for converting the C3-C4 paraffins into the aromatic stream, does not comprise co-feeding an oxygenate stream to the upgrading reactor.

14. The process according to claim 1, further comprising, prior to the step of adding the aromatic stream with the oxygenate feed stream:

conducting the aromatic stream to a buffer tank.

15. A plant for carrying out the process according to claim 1.

16. The process according to claim 1, wherein the aromatic stream is added at 50-70% of the total bed length.

17. The process according to claim 1, wherein the zeolitic catalyst is ZSM-5, the zinc compound is metallic and/or oxidic zinc, and optionally the zeolitic catalyst further comprises 1-5 wt % of a phosphorous compound.

18. The process according to claim 4, wherein the aromatic stream is a benzene-rich stream (B-rich stream) which is separated from the aromatic stream comprising BTX.

19. The process according to claim 7, wherein the one or more sulfur compounds include $H_2S$.

20. The process according to claim 7, wherein the content of the one or more sulfur compounds is 10-100 ppmv.

* * * * *